United States Patent
Tanaka et al.

(10) Patent No.: US 9,712,081 B2
(45) Date of Patent: Jul. 18, 2017

(54) POWER CONVERTER

(71) Applicant: TOSHIBA MITSUBISHI-ELECTRIC INDUSTRIAL SYSTEMS CORPORATION, Chuo-ku (JP)

(72) Inventors: Tsuguhiro Tanaka, Tokyo (JP); Naoki Fujiwara, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 148 days.

(21) Appl. No.: 14/501,143

(22) Filed: Sep. 30, 2014

(65) Prior Publication Data

US 2015/0016160 A1 Jan. 15, 2015

Related U.S. Application Data

(63) Continuation of application No. PCT/JP2012/058596, filed on Mar. 30, 2012.

(51) Int. Cl.
*H02M 7/44* (2006.01)
*H02M 7/49* (2007.01)
*H02M 1/08* (2006.01)
*H02M 7/493* (2007.01)
*H02J 3/38* (2006.01)

(52) U.S. Cl.
CPC ............... *H02M 7/44* (2013.01); *H02M 1/08* (2013.01); *H02M 7/49* (2013.01); *H02M 7/493* (2013.01); *H02J 3/385* (2013.01); *Y02E 10/58* (2013.01)

(58) Field of Classification Search
CPC ..................................................... H02M 7/44
USPC ........................................................ 363/65
See application file for complete search history.

(56) References Cited

U.S. PATENT DOCUMENTS

| | | | | |
|---|---|---|---|---|
| 5,742,496 A | * | 4/1998 | Tsutsumi | ............ H02M 7/4807 363/16 |
| 2005/0243584 A1 | * | 11/2005 | Abe | ...................... H02M 7/493 363/71 |
| 2006/0214604 A1 | * | 9/2006 | Matsuura | ............. H05B 41/282 315/291 |

FOREIGN PATENT DOCUMENTS

| | | |
|---|---|---|
| CN | 101604922 A | 12/2009 |
| JP | 61-94523 A | 5/1986 |
| JP | 6-165514 A | 6/1994 |
| JP | 6-197543 A | 7/1994 |
| JP | 6-197548 A | 7/1994 |
| JP | 7-325635 A | 12/1995 |
| JP | 2000-166098 A | 6/2000 |
| JP | 2000-305633 A | 11/2000 |
| JP | 2000-341959 A | 12/2000 |
| JP | 2001-16859 A | 1/2001 |
| JP | 2004-235123 A | 8/2004 |

(Continued)

OTHER PUBLICATIONS

U.S. Appl. No. 14/502,416, filed Sep. 30, 2014, Tanaka et al.

(Continued)

*Primary Examiner* — Jue Zhang
*Assistant Examiner* — Trinh Dang
(74) *Attorney, Agent, or Firm* — Oblon, McClelland, Maier & Neustadt, L.L.P.

(57) ABSTRACT

A power converter includes inverters, AC sides of the inverters being connected in parallel, and a controller configured to control total output power of the inverters by controlling output power of at least one of the inverters in a control cycle shorter than a shortest communication cycle which allows communication with each of the inverters.

11 Claims, 2 Drawing Sheets

(56) References Cited

FOREIGN PATENT DOCUMENTS

JP        2007-336764 A    12/2007
JP        2008-182836 A    8/2008

OTHER PUBLICATIONS

International Preliminary Report on Patentability and Written Opinion issued Oct. 9, 2014 in PCT/JP2012/058596.
International Search Report issued on Jul. 3, 2012 for PCT/JP2012/058596 filed on Mar. 30, 2012 with English Translation.
International Written Opinion mailed on Jul. 3, 2012 for PCT/JP2012/058596 filed on Mar. 30, 2012.
Extended European Search Report issued Apr. 12, 2016 in Patent Application No. 12872356.6.
A. A. Ghadimi, et al., "Control of Islanded Inverter Interfaced Distributed Generation Units for Power Quality Improvement" Harmonics and Quality of Power (ICHQP), 2010 $14^{th}$ International Conference on IEEE, XP031792985, Sep. 26, 2010, pp. 1-6.
Josep M. Guerrero, et al., "Control of Distributed Uninterruptible Power Supply Systems" IEEE Transactions on Industrial Electronics, vol. 55, No. 8, Aug. 1, 2008, XP011232126, pp. 2845-2859.
Office Action issued Apr. 25, 2016 in Chinese Patent Application No. 201280072142.8 (with English language translation).

* cited by examiner

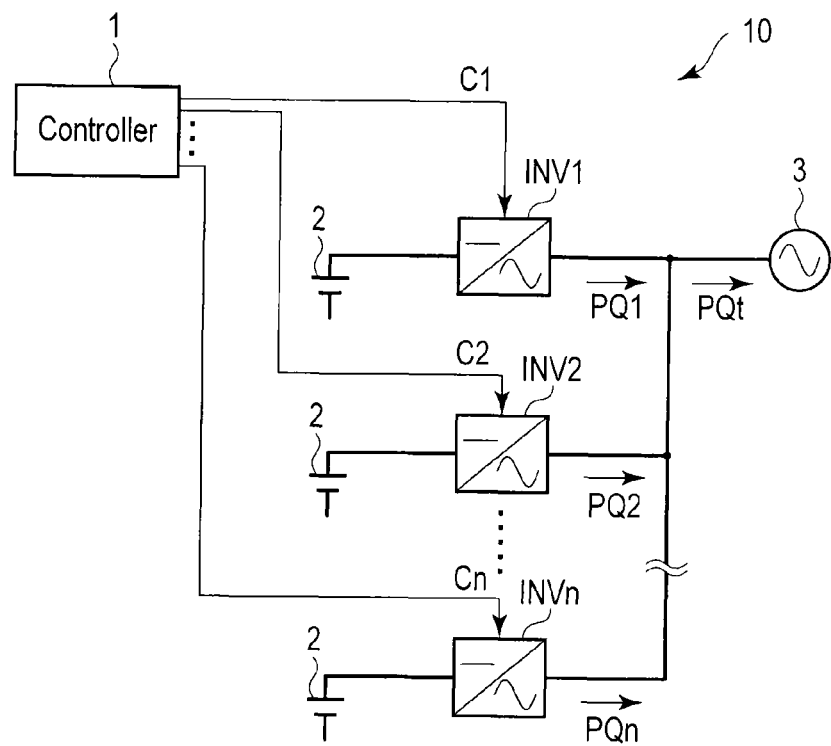
F I G. 1
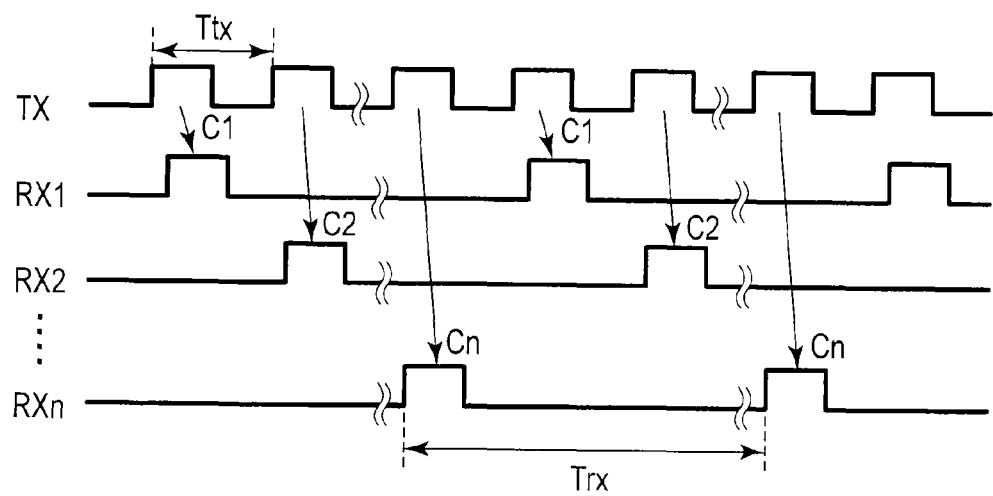
F I G. 2

POWER CONVERTER

CROSS REFERENCE TO RELATED APPLICATIONS

This application is a Continuation Application of PCT Application No. PCT/JP2012/058596, filed Mar. 30, 2012, the entire contents of which are incorporated herein by reference.

BACKGROUND OF THE INVENTION

1. Field of the Invention

The present invention relates generally to a power converter.

2. Description of the Related Art

In general, it is known to supply power to a load by power converters. Such power converters are controlled by various methods. For example, the following control methods are disclosed.

It is disclosed that the number of operating inverters is controlled to maximize alternating current (AC) output power of a power generation system (see Patent Literature 1). There is disclosed a power supply system in which a selection is randomly made from inverters and is operated (see Patent Literature 2). It is disclosed that maximum power of a photovoltaic cell detected from measured data of a pyranometer and a thermometer is compared to the total value of rated outputs of inverters and the inverters are controlled (see Patent Literature 3). It is disclosed that inverters are respectively connected to photovoltaic cells placed on respective roof surfaces facing in directions different from each other and the inverters are controlled (see Patent Literature 4).

However, if power is supplied to a load by power converters, it is hard to increase the accuracy of power to be supplied to the load because of an output error of each of the power converters.

BRIEF SUMMARY OF THE INVENTION

An object of the present invention is to provide a power converter capable of improving the accuracy of power to be supplied to a load by controlling inverters.

A power converter according to an aspect of the present invention comprises inverters, AC sides of the inverters being connected in parallel; and a controller configured to control total output power of the inverters by controlling output power of at least one of the inverters in a control cycle shorter than a shortest communication cycle which allows communication with each of the inverters.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a structural view showing a structure of a power conversion system according to a first embodiment of the present invention;

FIG. 2 is a waveform chart showing a relationship between a control cycle of a controller and a communication cycle of an inverter according to the first embodiment;

DETAILED DESCRIPTION OF THE INVENTION

Figure 3:
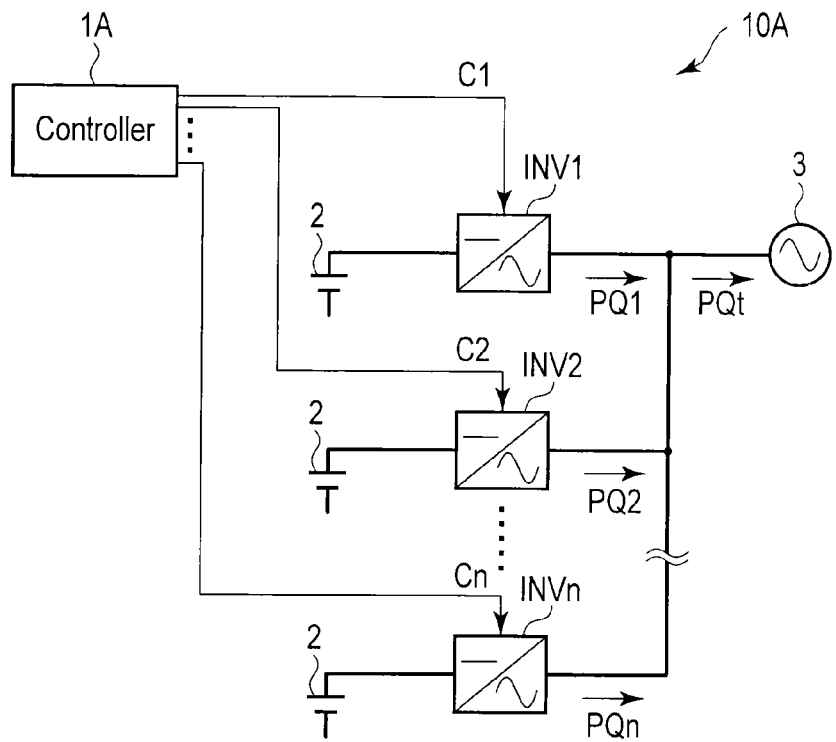
FIG. 3 is a structural view showing a structure of a power conversion system according to a second embodiment of the present invention.

Embodiments of the present invention will be described below with reference to the accompanying drawings.

First Embodiment

FIG. 1 is a structural view showing a structure of a power conversion system 10 according to a first embodiment of the present invention. Also, the same portions in the drawings are given the same signs, the detailed explanations thereof will be omitted, and different portions will be mainly described. Also in the following embodiment, overlapping explanations will be omitted.

The power conversion system 10 includes a controller 1, n direct current (DC) power sources 2, an AC power system 3, and n inverters INV1 to INVn. Here, n is an integer greater than one.

To DC sides of the inverters INV1 to INVn, the DC power sources 2 are connected, respectively. AC sides of all the inverters INV1 to INVn are connected to the AC power system 3. The inverters INV1 to INVn convert DC power supplied from the DC power sources 2 into AC power and supply it to the AC power system 3. The inverters INV1 to INVn are controlled in accordance with control command values C1 to Cn output from the controller 1. In addition, the inverters INV1 to INVn are provided with control modules (not shown in the figures), respectively. Necessary control other than those by a command from the controller 1 is executed over the inverters INV1 to INVn by the control modules provided, respectively. For example, the control modules perform monitoring, measurement, protection, transmission and reception of data to and from the controller 1, intermediation of control by the controller 1, and the like. A part of the functions performed by the control modules may be performed by the controller 1.

The DC power sources 2 supply DC power to the inverters INV1 to INVn, respectively. The DC power sources 2 may be any things as long as they output DC power. For example, the DC power sources 2 are photovoltaic (PV) cells, secondary cells, or converters.

The AC power system 3 is an AC load which receives AC power Pt from the inverters INV1 to INVn. The AC power system 3 may include an AC power source.

The controller 1 executes such control under which all the inverters INV1 to INVn are controlled together. The controller 1 generates control command values C1 to Cn for controlling the respective inverters INV1 to INVn. The controller 1 outputs control command values C1 to Cn to the respective inverters INV1 to INVn at regular time intervals, and controls output powers PQ1 to PQn of the respective inverters INV1 to INVn. Power PQt to be supplied to the AC power system 3 is thereby controlled.

Control command values C1 to Cn include set values for each of effective power and reactive power. Here, the set values are values which determine the output power values preset for the inverters INV1 to INVn. Accordingly, set values determined by the controller 1 correspond to power command values for output powers PQ1 to PQn of the respective inverters INV1 to INVn. These set values are determined, such that the n inverters INV1 to INVn share a required power value required by the AC power system 3 input from an upper control system. The required power value may be preset for the controller 1.

In addition, control command values C1 to Cn include information necessary for controlling the respective inverters INV1 to INVn, information necessary for communication, and the like. The inverters INV1 to INVn output powers PQ1 to PQn in accordance with control command values C1 to Cn received, respectively. Total power PQt output from the inverters INV1 to INVn is thereby supplied to the AC power system 3.

Also, when output powers PQ1 to PQn of the inverters INV1 to INVn are changed, the controller 1 calculates a change rate of power. The controller 1 determines set values, such that a calculated change rate of power falls within a preset permissible range of an output change rate. For example, output powers PQ1 to PQn of the inverters INV1 to INVn are rapidly changed in such cases as those where the DC power sources 2 are PV cells which are rapidly insolated.

In addition, the controller 1 has a scheduling function for activating or stopping the inverters INV1 to INVn sequentially, and the like.

FIG. 2 is a waveform chart showing a relationship between a control cycle Ttx of the controller 1 and a communication cycle Trx of the inverters INV1 to INVn according to the present embodiment. A wavy form TX indicates the state of the controller 1. Wavy forms RX1 to RXn indicate the states of the control modules of the inverters INV1 to INVn, respectively. In each of the wavy forms TX and RX1 to RXn, a high level and a low level indicate being in a calculation process and not being in a calculation process, respectively.

A cycle in which the wavy form TX of the controller 1 reaches a high level is the control cycle Ttx. The control cycle Ttx is also the resolution of control intervals of the power conversion system 10. A cycle in which the wavy forms RX1 to RXn of the inverters INV1 to INVn reach a high level is the communication cycle Trx with the controller 1. Here, it is supposed that the communication cycle Trx is set at a shortest cycle.

The controller 1 outputs control command values C1 to Cn at regular intervals sequentially in the order of the first inverter INV1, the second inverter INV2, . . . , the n-th inverter INVn. After outputting the control command value Cn to the last n-th inverter INVn, the controller 1 outputs again the control command values C1 to Cn in order from the first inverter INV1. The controller 1 repeats this and controls the total output power PQt of the inverters INV1 to INVn. That is, the controller 1 sequentially controls output powers PQ1 to PQn of the respective inverters INV1 to INVn with time-shared time differences.

In this manner, the controller 1 controls the total output power PQt of the inverters INV1 to INVn substantially in the control cycle Ttx.

According to the present embodiment, even if the shortest communication cycle Trx between the controller 1 and each of the inverters INV1 to INVn is longer than the control cycle Ttx of the controller 1, the total output power PQt of the inverters INV1 to INVn can be controlled in the control cycle Ttx. The controller 1 can thereby improve the accuracy of power to be supplied to the AC power system 3. Thus, the power conversion system 10 can perform stable power supply to the AC power system 3.

If the communication cycle Trx between the controller 1 and each of the inverters INV1 to INVn is longer than the control cycle Ttx of the controller 1, the controller 1 can control the individual inverters INV1 to INVn only in the communication cycle Trx.

Thus, by controlling at least one of the inverters INV1 to INVn in the control cycle Ttx, the controller 1 can control the total output power PQt of the inverters INV1 to INVn in the control cycle Ttx shorter than the shortest communication cycle Trx.

Also, the controller 1 can cause the total output power PQt of the inverters INV1 to INVn to reach target output power PQt promptly by gradually changing the output power PQt within a preset permissible range of a power change rate in the control cycle Ttx. The power conversion system 10 can thereby perform stable power supply to the AC power system 3 without causing a rapid power fluctuation even if the output power PQt is greatly changed.

Second Embodiment

FIG. 3 is a structural view showing a structure of a power conversion system 10A according to a second embodiment of the present invention.

The power conversion system 10A is obtained by replacing the controller 1 with a controller 1A in the power conversion system 10 according to the first embodiment shown in FIG. 1. With respect to the other points, the power conversion system 10A has the same structure as that of the power conversion system 10 according to the first embodiment.

The controller 1A is obtained by adding the following structures and functions to the controller 1 according to the first embodiment.

Figure 4:
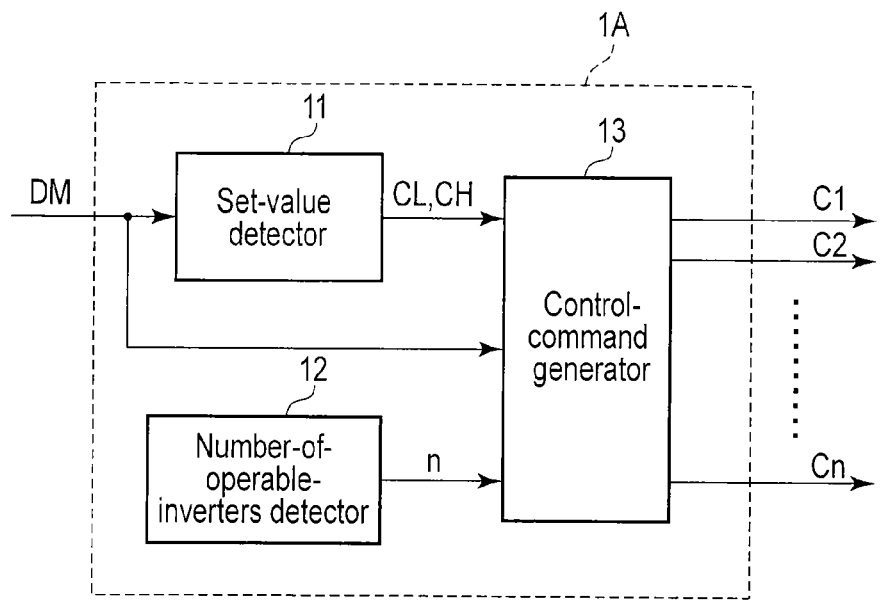
FIG. 4 is a structural view showing a structure of a controller according to the second embodiment.

FIG. 4 is a structural view showing a structure of the controller 1A according to the present embodiment.

The controller 1A includes a set-value detector 11, a number-of-operable-inverters detector 12, and a control-command generator 13.

To the set-value detector 11, a required power value DM required by the AC power system 3 is input. The set-value detector 11 detects one or two set values for each of effective power and reactive power. The set-value detector 11 outputs a detected set value to the control-command generator 13.

The number-of-operable-inverters detector 12 detects the number n of operable inverters INV1 to INVn all the time. The number n may be detected in any way. For example, the number-of-operable-inverters detector 12 receives, from wiring connected to each of the inverters INV1 to INVn, a signal indicating whether they are operable or not.

To the control-command generator 13, the required power value DM, one or two set values detected by the set-value detector 11, and the number n detected by the number-of-operable-inverters detector 12 are input. The control-command generator 13 generates control command values C1 to Cn on the basis of the required power value DM, the one or two set values, and the number n. The control-command generator 13 outputs generated control command values C1 to Cn to the respective inverters INV1 to INVn and controls the inverters INV1 to INVn individually.

Next, a control method of the inverters INV1 to INVn by the controller 1A will be described. Here, it is supposed that performance such as the control cycle and the resolution of output power of all the inverters INV1 to INVn is the same. Also, although control over effective power will be described, the same is true of control over reactive power.

Now, it is supposed that the required power value DM requires that effective power corresponding to P % of the total of respective maximum output powers of the n inverters INV1 to INVn be supplied to the AC power system 3. That is, if all the n inverters INV1 to INVn output effective power of exactly P % of maximum output power (the average effective power value obtained by dividing the required power value DM by n, if capacities are the same; an effective power value obtained by proportionally dividing the required power value DM on the basis of rated outputs of the respective inverters, if the capacities are different), power according to the required power value DM can be supplied to the AC power system 3.

The controller 1A detects the number n of operable inverters INV1 to INVn. Here, it is supposed that all the n inverters INV1 to INVn are operable.

If effective power of exactly P % of maximum output power can be output from each of the inverters INV1 to INVn (if the inverters INV1 to INVn have set values of P %), the controller 1A outputs, to all the inverters INV1 to INVn, control command values C1 to Cn to output effective power of P % at the common set values of P %. Here, if the difference between a set value closest to P % and P % is lower than the value obtained by dividing the resolution of output powers of the inverters INV1 to INVn by the number n, the set value closest to P % can be regarded as a set value of exactly P %.

If the inverters INV1 to INVn cannot output effective power of exactly P % by the resolution of output powers of the inverters INV1 to INVn (if the inverters INV1 to INVn do not have set values of P %), the controller 1A controls the n inverters INV1 to INVn in the following manner.

First, the controller 1A searches for two set values CL and CH which the inverters INV1 to INVn can output. The low set value CL is a set value of CL % which is closest to P % while being lower than P %. The high set value CH is a set value of CH % which is closest to P % while being higher than P %.

Next, the controller 1A determines inverters INV1 to INVn to be made to output the low set value CL and inverters INV1 to INVn to be made to output the high set value CH, respectively, on the basis of the number n of operable inverters INV1 to INVn. The numbers of the inverters INV1 to INVn to be made to output the two set values CL and CH, respectively, are determined, such that the total of effective power output from all the inverters INV1 to INVn becomes closest to a required effective power of P %.

The controller 1A outputs control command values C1 to Cn to the respective inverters INV1 to INVn to make them output power at the set values CL and CH.

Next, with respect to the case where the inverters INV1 to INVn do not have the same set values as required output powers PQ1 to PQn, the control of the inverters INV1 to INVn by the controller 1A will be described with concrete examples.

Here, it is supposed that the required power value DM requires that effective power corresponding to 60.3% of the total of respective maximum output powers of ten inverters INV1 to INVn be supplied to the AC power system 3. Also, it is supposed that the resolution of output powers of the inverters INV1 to INVn is in steps of 1%.

The controller 1A searches for a set value CL which is closest to 60.3% while being lower than 60.3%. The controller 1A determines that the set value CL is 60%. Also, the controller 1A searches for a set value CH which is closest to 60.3% while being higher than 60.3%. The controller 1A determines that the set value CH is 61%.

The controller 1A performs calculation for determining the respective numbers of inverters INV1 to INVn to be made to output the set value CL and the set value CH. The controller 1A determines the respective numbers of the inverters INV1 to INVn to be made to output the set value CL and the set value CH, such that the total effective power of ten inverters INV1 to INVn becomes closest to effective power required by the required power value DM. More specifically, the controller 1A determines that the number of the inverters INV1 to INVn to be made to output the low set value CL is seven, and the number of the inverters INV1 to INVn to be made to output the high set value CH is three.

Thus, the controller 1A generates control command values C1 to Cn to make seven inverters INV1 to INVn output the low set value CL, and to make three inverters INV1 to INVn to output the high set value CH.

The inverters INV1 to INVn output power to the AC power system 3 in accordance with the control command values C1 to Cn generated as described above. The inverters INV1 to INVn thereby supply effective power of 60.3% as required by the required power value DM, while they have the accuracy with which power of 60% is output by a command value of 60.3%.

Next, the case where the inverters INV1 to INVn have stopped because of a failure, etc., will be described.

Here, it is supposed that the first inverter INV1 has stopped during operation of the power conversion system 10A. Also, it is supposed that the inverter INV1, which has stopped, performed output according to the low set value CL.

The controller 1A detects, by the number-of-operable-inverters detector 12, that the number of operating inverters has decreased by one to n−1. The controller 1A calculates set values for the respective inverters INV2 to INVn excluding the first inverter INV1 as in the above-described case where the number of operating inverters is n, such that effective power corresponding to the low set value CL is shared by n−1 inverters.

Also, the controller 1A calculates a change rate of power to be supplied to the AC power system 3 in the case where power corresponding to the low set value CL is increased.

If a calculated change rate of power falls within a preset permissible range of an output change rate, the controller 1A outputs control command values C2 to Cn on the basis of calculated set values for the respective inverters INV2 to INVn.

When the inverter INV1 has stopped, the permissible range of the output change rate of the total output power PQt is prevented from being exceeded by reducing output of the inverter INV1 and increasing outputs of the other inverters INV2 to INVn.

Next, the case where the required power value DM increases, exceeding the permissible range of the output change rate, will be described.

If a change rate of power due to an increase in the required power value DM has exceeded the preset permissible range of the output change rate, the controller 1A limits set values for the respective inverters INV1 to INVn for outputting an increased required power value DM within the permissible range of the output change rate. The controller 1A outputs control command values C1 to Cn on the basis of the limited set values. Then, the controller 1A outputs the control command values C1 to Cn, gradually increasing the set values until they reach values before limitation, not to exceed the permissible range of the output change rate.

According to the present embodiment, the following operation and effect can be obtained in addition to the operation and effect according to the first embodiment.

The controller 1A can make the resolution (%) of the total output power PQt of all the inverters INV1 to INVn smaller than the resolution of output powers PQ1 to PQn of the individual inverters INV1 to INVn by controlling the inverters INV1 to INVn through division into set values CL and CH which are respectively lower and higher than a value obtained by dividing the required power value DM by the number n of operable inverters INV1 to INVn. The controller 1A can thereby increase the accuracy of making the total output power PQt of the inverters INV1 to INVn closer to the required power value DM.

Also, even if the inverters INV2 to INVn have stopped, a rapid fluctuation of power to be supplied to the AC power system 3 can be prevented by changing the total output power PQt of the inverters INV1 to INVn within a preset permissible range of an output change rate.

In each of the embodiments, if any of the inverters INV1 to INVn has stopped, the control cycle Ttx of the controller 1 may be changed to be longer within a range shorter than the shortest communication cycle Trx with each of the inverters INV1 to INVn. The total output power PQt of the inverters INV1 to INVn can be thereby controlled in the regular control cycle Ttx, even if the operable inverters INV1 to INVn have decreased. Also, the number of operable inverters may be detected as in the second embodiment.

Also, in each of the embodiments, if the total output power PQt of the inverters INV1 to INVn can be controlled in the control cycle Ttx, control command values may be simultaneously output to a part of inverters.

Moreover, in the first embodiment, the controller 1 may determine set values in any way on the basis of a required power value. In addition, all the inverters INV1 to INVn may be controlled at one set value, or may be controlled at two or more set values.

Also, in the second embodiment, the numbers of inverters INV1 to INVn to be made to output two set values CL and CH, respectively, are determined according to required power; however, this does not impose any restrictions on methods of determining the numbers of the inverters INV1 to INVn. For example, the inverters INV1 to INVn to be made to output two values CL and CH, respectively, may be determined in advance. Even if the numbers of the inverters INV1 to INVn to be made to output the two set values CL and CH, respectively, are preset to be the same, the resolution of the total output power PQt of the inverters INV1 to INVn can be half that in the case where output is performed at one set value all the time.

Furthermore, in the second embodiment, it is desirable that the two set values CL and CH be set at set values closest to the power values to be output; however, this does not impose any restrictions. Even if the two set values CL and CH are not the set values closest to the power values to be output, any set values CL and CH may be selected as long as the accuracy of the total output power of the inverters INV1 to INVn is improved.

Also, in the second embodiment, if there is a set value which is exactly the same as the power value to be output, all the inverters INV1 to INVn are controlled at exactly the same set value; however, this does not impose any restrictions. If the number of the inverters INV1 to INVn is three or more, they may be controlled at two set values all the time. Also, in this case, the resolution of the total output power PQt of the inverters INV1 to INVn can be made finer than that in the case where control is executed at one set value all the time.

Moreover, in the second embodiment, the number n of operable inverters INV1 to INVn is detected, but may be preset. In this case, if any of the inverters INV1 to INVn is broken, an operator may change the set number, or a control method of the inverters INV1 to INVn may be changed to another. Another control method is, for example, a method of making all the inverters INV1 to INVn output power at the same set value.

Also, in the second embodiment, performance such as the control cycle and the resolution of output power of all the inverters INV1 to INVn has been described as being the same, but this does not impose any restrictions. The inverters INV1 to INVn may be configured in any way, as long as the inverters INV1 to INVn can be controlled at a set value CL and a set value CH which are lower and higher, respectively, than a proportional division value obtained by proportionally dividing the required power value DM on the basis of rated outputs of the respective inverters INV1 to INVn (if the rated outputs are the same, the average power value obtained by dividing the required power value DM by the number n of operable inverters INV1 to INVn) and the total output power value PQt of the inverters INV1 to INVn can be controlled with a resolution (%) smaller than the resolution (%) of the individual inverters INV1 to INVn.

It is to be noted that the present invention is not restricted to the foregoing embodiments, and constituent elements can be modified and changed into shapes without departing from the scope of the invention at an embodying stage. Additionally, various inventions can be formed by appropriately combining a plurality of constituent elements disclosed in the foregoing embodiments. For example, several constituent elements may be eliminated from all constituent elements disclosed in the embodiments. Furthermore, constituent elements in the different embodiments may be appropriately combined.

What is claimed is:

1. A power converter comprising:
   inverters, AC sides of the inverters being connected in parallel; and
   a controller configured to control total output power of the inverters by controlling output power of at least one of the inverters by a control command in a control cycle shorter than a shortest communication cycle which allows communication of the control command with each of the inverters and determine a first power command value and a second power command value, the first power command value being lower than a proportional division power value obtained by proportionally dividing a required power value required as the total output power of the inverters based on respective rated outputs of the inverters, the second power command value being higher than the proportional division power value, wherein the controller controls output powers of the inverters at the first power command value and the second power command value determined by the controller.

2. The power converter of claim 1, wherein the controller controls the inverters in predetermined order.

3. The power converter of claim 1, wherein the controller determines the first power command value and the second power command value at power command values which are allowed to be output by the inverters and are closest to the proportional division value.

4. The power converter of claim 1, wherein the controller determines number of inverters to be made to perform output at the first power command value and number of inverters to be made to perform output at the second command value, respectively, to make the total output power of the inverters reach a power value closest to the required power value.

5. The power converter of claim 1, wherein the controller is further configured to control output powers of the in s at a common set values.

6. The power converter of claim 1, further comprising a number-of-operable-inverters detector configured to detect number of operable inverters of the inverters.

7. The power converter of claim 1, further comprising a number-of-operable-inverters detector configured to detect number of operable inverters of the inverters.

8. The power converter of claim 1, wherein the controller controls to change a rate of the total output power of the inverters within a preset permissible range.

9. The power converter of claim 1, wherein the controller controls to change a rate of the total output power of the inverters within a preset permissible range.

10. A control apparatus for a power converter, the control apparatus controlling the power converter including inverters, AC sides of the inverters being connected in parallel, the control apparatus comprising:
a controller configured to control total output power of the inverters by controlling output power of at least one of the inverters by a control command in a control cycle shorter than a shortest communication cycle which allows communication of the control command with each of the inverters and determine a first power command value and a second power command value, the first power command value being lower than a proportional division power value obtained by proportionally dividing a required power value required as the total output power of the inverters based on respective rated outputs of the inverters, the second power command value being higher than the proportional division power value, wherein the controller controls output powers of the inverters at the first power command value and the second power command value determined by the controller.

11. A control method for a power converter, the control method controlling the power converter including inverters, AC sides of the inverters being connected in parallel, the control method comprising:
controlling, by a controller, total output power of the inverters by controlling output power of at least one of the inverters by a control command in a control cycle shorter than a shortest communication cycle which allows communication of the control command with each of the inverters;
determining, by the controller, a first power command value and a second power command value, the first power command value being lower than a proportional division power value obtained by proportionally dividing a required power value required as the total output power of the inverters based on respective rated outputs of the inverters, the second power command value being higher than the proportional division power value; and
controlling, by the controller, output powers of the inverters at the first power command value and the second power command value determined by the controller.

* * * * *